United States Patent [19]

Gröllmann

[11] Patent Number: 5,116,127
[45] Date of Patent: May 26, 1992

[54] FIBER OPTIC SAGNAC INTERFEROMETER WITH DIGITAL PHASE RAMP RESETTING

[75] Inventor: Peter Gröllmann, Freiburg, Fed. Rep. of Germany

[73] Assignee: Litef GmbH, Freiburg im Breisgau, Fed. Rep. of Germany

[21] Appl. No.: 633,420

[22] Filed: Dec. 24, 1990

[30] Foreign Application Priority Data

Jan. 3, 1990 [EP] European Pat. Off. ............ 90100103

[51] Int. Cl.⁵ .............................................. G01C 19/72
[52] U.S. Cl. .................................................... 356/350
[58] Field of Search ......................................... 356/350

[56] References Cited

U.S. PATENT DOCUMENTS 4,705,399  11/1987  Graindorge et al. ............... 356/350

FOREIGN PATENT DOCUMENTS 2152207   7/1985   European Pat. Off. .
168292    1/1986   European Pat. Off. .
294915   12/1988   European Pat. Off. .
359666    3/1990   European Pat. Off. .
3144162   7/1986   Fed. Rep. of Germany .

*Primary Examiner*—Samuel A. Turner
*Assistant Examiner*—LaCharles P. Keesee, II
*Attorney, Agent, or Firm*—Elliott N. Kramsky

[57] ABSTRACT

In a fiber optic interferometer rotation rate sensor reset by phase ramp via a digital control circuit to undertake the reversal required to obtain the scale factor error information, a reciprocal, alternating phase shift that is not a function of the angle of rotation, but has a fixed timing, is synchronized with gyroscope modulation frequency to avoid lock-in, and scale factor nonlinearities, particularly in the case of low rates of rotation. Even in the case of low rates of rotation, a scale factor error correction is possible and lock-in, caused by variations in bias in the case of the modulation deviation reversal, is avoided.

6 Claims, 8 Drawing Sheets

FIBER OPTIC SAGNAC INTERFEROMETER WITH DIGITAL PHASE RAMP RESETTING

BACKGROUND

1. Field of the Invention

The present invention relates to fiber optic rotation rate sensors. More particularly, this invention pertains to a fiber optic Sagnac interferometer arrangement for avoiding lock-in and scale factor nonlinearities at low rotation rates.

2. Description of the Prior Art

Printed publication DE-A1-3,144,162 describes a method for measuring nonreciprocal phase shifts in a fiber optic Sagnac interferometer ("ring interferometer") by readjusting the nonreciprocal phase shifts (e.g. on the basis of rates of rotation) by applying, on the one hand, a phase deviation having a specific amplitude that can be reversed with the frequency $f_0 = \frac{1}{2}t_0$ and, on the other hand, a saw-toothed voltage that likewise shifts the phase deviation, $t_0$ designating the transit time of each of the light beams through the fiber coil, to the phase modulator located in the region of the fiber coil input. The gradient of the compensating or resetting saw-toothed voltage (phase ramp) corresponds to rotation rate and is, thus, proportional to $\phi_0/t_0$ where $\phi_0$ is the nonreciprocal phase shift caused, for example, by a rotational movement. In practice, however, it is barely possible to employ the so-called phase ramp resetting method described in the above-referenced publication. This is due to the fact that inertial rotation rate measurements require accuracies with respect to the reversible phase deviations, amplitude or gradient of resetting signal and proportionality or scale factor that analog circuit design cannot necessarily guarantee.

U.S. Pat. No. 4,705,399 teaches an advance in the above-mentioned ramp resetting method for fiber optic ring interferometers that operates entirely digitally for signal evaluation and conditioning. As a result, the required signal precision, particularly with respect to accuracy of the reversible phase deviations and ramp resetting signal, can be obtained by a unique allocation of an automatic measuring range reversal and a correction of the scale factors.

The functional principle of the digital phase ramp resetting method of the prior art is first explained with reference to FIG. 14. (FIG. 14 corresponds, in a simplified way, to the prior art disclosed in FIG. 14 of U.S. Pat. No. 4,705,399. cf. H. C. Lefèvre et al. in Integrated Optics: "A practical solution for the Fiber-Optic Gyroscope", SPIE Vol. 719, Fiber Optic gyros, 1986.)

The schematic representation of FIG. 14 shows a light source L (e.g., a laser) whose parallel light beams are split into two light beams via a beam splitter ST1, and irradiated into an interferometer fiber coil FS in opposite directions. The fiber coil FS preferably consists of an optical monomode fiber. The beam splitter ST1 simultaneously acts as a mixer for recombining the two light beams after traverse of the fiber coil FS. The interference signal of the two superimposed light beams passes via a second beam splitter ST2 and the output branch AUS to a photodetector PD that scans the intensity of the interference pattern. Using $\Delta\phi_0$ to designate the phase difference between the two light beams that propagate in opposite directions in the closed fiber coil FS, it holds that $\Delta\phi_0 = 0$ as long as there are no nonreciprocal disturbances. (Reference should be made to the cited literature concerning the mathematical relation between the phase difference $\Delta\phi_0$ and the rotation rate or rotational speed, the optical power density at the input of the photodetector PD, and measuring sensitivity.) A method for increasing the sensitivity of the interferometer by introducing a constant, nonreciprocal bias to the two counterrotating light beams in the fiber coil FS so that the counter-rotating beams (light waves) are periodically shifted (by a phase modulator PM) to the operating point of highest sensitivity of the interferometer by $(2n+1)\pi/2$ where n is a whole number is also described. The phase modulator PM is first excited with a signal $\phi_1(t)$ that causes a period phase shift (e.g. $\pm\pi/2$, $3/2\pi$, . . . ,) of period $2t_0$, $t_0$ designating the transit time of a light wave in the fiber coil FS.

In the circuit of FIG. 14, nonreciprocal phase shifts that result from negative feedback to the phase modulator PM are compensated, as described in the referenced patent, by a so-called phase ramp signal, whose gradient is proportional to $\Delta\phi/t_0$, where $\Delta\phi$ is the nonreciprocal phase shift. The resetting phase ramp signal is a sawtooth or staircase waveform in which the sawtooth amplitude or riser height is equal to $\Delta\phi$ and the duration of the sawtooth or riser corresponds to the transit time $t_0$ or an odd-numbered multiple thereof.

In contrast to an analog solution the digital phase ramp principle described, e.g., in U.S. Pat. No. 4,705,399, possesses a decided advantage in that the scale factors of the phase modulation control and phase ramp resetting signals are corrected, at least in principle, and precise definition of the sawtooth amplitude of the resetting signal is guaranteed.

The function of a circuit in accordance with FIG. 14 (i.e., generating a reciprocal phase shift that alternates in time with the frequency $f_0$ and optimizing the operating point) and the stair-step ramp resetting signal including scale factor regulation, is explained briefly as follows. The output VD of the photodetector PD is raised by an impedance converter and amplifier $A_0$, whose output signal VD' feeds a synchronous demodulator SYNCD. The demodulator is synchronized to the scanning frequency $f_0 = \frac{1}{2}t_0$. Its output passes as the signal VA through an amplifier A that, as a rule, is combined with a filter, to an analog-to-digital converter AD. The digital output of the converter is proportional to rotation rate and contains an item of sign information with respect to the direction of rotation. The signal VAD then passes to a circuit GSC, that essentially comprises a digital integrator that supplies a combined phase control signal VSC that consists of the digital phase ramp resetting signal and the digital phase modulation signal. The combined digital signal VSC is subsequently converted in a digital-to-analog converter DA to an analog control voltage VC, and transmitted by a driver amplifier AP as control voltage to the phase modulator PM.

The GSC circuit comprises a first memory M for intermediate storage of the digital signal VAD. The intermediate stored output signals $SM_1$ pass to a first input $e_1$ of an adder ADD that is connected in cascade to a second memory $M_2$. Output signals VSC stored intermediately in the second memory $M_2$ are fed back to a second input $e_2$ of the adder ADD and added to the digital value of the rotation rate signal. The output signal SADD of the adder ADD thus corresponds to the angle of rotation.

The circuit described so far is synchronized and controlled by a central processor CPU through a bidirectional bus BC that is connected to a quartz-stabilized oscillator OSC that supplies the frequency $f_0$.

Aside from the number of bits per word (referring to a specific angle of rotation, e.g. four seconds of arc, which bits correspond to the capacity of the adder ADD), the adder supplies an overflow signal at an output SL via the bus BC to the central processor CPU. In accordance with the overflow signals from the adder and the clock signal of the oscillator OSC the central processor CPU generates the various control and synchronization signals. A switchover is made between a "mode A" and a "mode B" in order to enable a scale factor correction, that depends upon the overflow of the modulation deviation of adder ADD. The switchover is made in such a way that a modulation deviation of, for example, $\pm\pi/2$ holds for mode A and $\pm 3\pi/2$ holds for mode B. As is described in the above-referenced literature, detected amplitude differences between the operating states with different modulation deviations serve as a measure of the scale factor error at phase ramp signal overflow. To correct such scale factor error, the circuit of FIG. 14 is equipped with a demodulator SFC that detects amplitude differences between the $f_0$ modulation signal in mode A (phase deviation e.g. $\pm\pi/2$) and mode B (phase deviation e.g. $\pm 3\pi/2$). The SFC transmits the demodulated signal as an analog correction signal SIA via an integrating amplifier IA to a correcting analog input $e_m$ of the digital-to-analog converter DA.

The functional principle of the digital ramp resetting method for fiber optic rate-of-rotation sensors in which the gradient of the phase ramp is a measure of the reset rotation rate and in which there is a reversal of the modulation deviation in a ratio 1:3 in the return phase, in order to obtain a correction signal for the scale factor, is described briefly with reference to FIG. 14 and leads, in practical operation of such parasitic rotation rate measuring devices to substantial difficulties as discussed below.

The reversal from "mode A" to "mode B" is directly dependent upon the ramp value of the resetting sawtoothed signal and, thus, the angle of rotation of the gyroscope. In this regard, a ramp traversal can correspond to an angular increment of, for example, approximately four seconds of arc. However, by trebling the amplitude of the modulation signal and through parasitics in the sensitive signal path of the photodetector signal VD, modulation deviation reversal causes reversal of the gyroscope bias. Such undesired parasitic effects are indicated by dashed lines and the coupling factor K of FIG. 14. Since modulation deviation signal reversal is, however, dependent upon the angle of rotation, this leads to gyroscope deadband or lock-in. As explained below, this effect also leads to a scale factor nonlinearity outside the lock-in zone.

As is shown in FIG. 13 of U.S. Pat. No. 4,705,399, the mean intensity I of the photodetector signal VD will differ in the case of modulation deviations of mode A for that in the case of modulation deviations of mode B given the occurrence of a scale factor error. This intensity difference is integrated in the integrating amplifier IA and supplies the analog correction signal at the input $e_m$ of the digital-to-analog converter DA. The frequency of change in intensity is equal to the frequency of change from mode A to mode B, and thus equals the ramp signal return frequency as reversal (e.g., from mode A to mode B), is produced by ramp overflow (i.e., the signal SL of the adder ADD). This frequency of change is proportional to the rotation rate. That is, in accordance with the example explained in the referenced patent, a return of $2\pi$ corresponds to an angular increment of 5 seconds of arc; at a 1 Hz return frequency this corresponds to a rotation rate of 5°/h.

In the case of low rotation rates, the frequency of change can become arbitrarily low. Accordingly, the integrating amplifier IA seldom contains intensity difference information. During the arbitrarily long intervals during which the mode does not change, the integrating amplifier IA does not possess such information. Thus, every small electrical zero error at its input causes its output quantity (the scale factor correction signal SIA) to drift. The scale factor is, therefore, susceptible to drifting of the integrating amplifier IA at low rotation rates. The percentage error in the absolute value of rotation rate caused by scale factor drift is small for low rotation rates. However, a sudden sharp rise in rotation rate becomes problematic since the scale factor is still "wrong" and, thus, large errors (absolute value) also will occur in the rotation rate at least until the scale factor control circuit returns to steady state.

It would, therefore seem advisable to remove, or at least reduce, the electromagnetic parasitics (disturbances with a coupling factor K; see FIG. 14) by electromagnetic compatibility measures (EMC measures). That is, one might consider the use of shields (indicated in FIG. 14 by shielding the connecting line from the driver amplifier AP to the phase modulator PM) and the installation of filters in the signal and voltage feed lines. However, the known interferometer design of FIG. 14 presents special EMC problems. The signal VSC or VC, VC' contains the modulation frequency $f_0 = \frac{1}{2}t_0$ that is generated in the oscillator OSC or via the processor CPU. However, the photodetector signal VD contains the rotation rate information with the same frequency and phase angle. This signal is detected by the synchronous demodulator SYNCD. The circuit groups that generate the modulation quantity of frequency $f_0$, and the circuit parts that conduct the signal of the same frequency which is sensitive to rotation rate, are closely connected in space and have, by and large, to be fed from a common power supply device. This clearly presents a danger that electromagnetic energy of frequency $f_0$ will parasitically enter the sensitive signal path (signal VD). The use of stop filters for $f_0$ in the signal lines is not possible since the desired signal information is present at such frequency. Undesired parasitics can be reduced only to a certain extent by shielding the amplifier $A_0$ and the synchronous demodulator SYNCD against the rest of the circuit and by filtering their power supply.

A numerical example of the parasitic sensitivity will immediately clarify the particular problems to a person skilled in the art. The spectral component of frequency $f_0$ in the signal VC or VC' is generally located in the range of a few V. By contrast, in the rotation rate signal VD voltages in the range of a few nV correspond—depending upon optical power, detector sensitivity and gyroscope scale factor—to a rotation rate of 1°/h. With such large amplitude differences, an undesired parasitic path will be unavoidable despite all possible EMC measured, as is symbolized in FIG. 12 by the coupling factor K located between the signals VC, VC' and VD. Naturally, due to different parasitic amplitudes, different errors, equivalent to rotation rates, in the signal VD, will be dependent upon the operating state (mode A or B) since, as assumed, the latter has a modulation amplitude three times higher than the former, and thus has a stronger parasitic effect. The different parasitic amplitudes lead, with reference to rotation rates, to different gyroscope zero point errors that are designated as biases $B_a$ or $B_b$, depending upon the instantaneous modulation state (mode A or mode B).

Thus, the ramp gradient of the resetting signal is regulated by the closed control circuit proportional to the sum of the true input rotation rate $D_e$ and the respective bias $B_a$ or $B_b$, depending upon modulation mode.

FIG. 1 shows an example in which $D_e+B_a>O$, $D_e+B_b>O$ and $B_a>B_b$ (i.e., different biases $B_a$ or $B_b$ are present). Assuming that $D_e$ is a constant, different ramp gradients are produced depending upon whether mode A or mode B is present at that instant, since ramp gradient is proportional to $D_e+B_a$ or $D_e+B_b$.

In the example of FIG. 1, the gradient during mode B is flatter than in mode A, since $B_b<B_a$. Thus, the dwell time $t_b$ in mode B is larger than the dwell time $t_a$ in mode A than would be the case for biases independent of mode ($B_a=B_b$). However, since not only $B_a$ and $B_b$ but also the input rate of rotation $D_e$ influences the ramp gradient in both modes, the pulse-duty factor of the modes ($T_a/T_b$) also depends upon $D_e$. The scale factor nonlinearity mentioned above results from this.

On the other hand, the above-mentioned lock-in effect occurs in a rotation rate range for which the sign of the sum ($D_e+B_a$) or ($D_e+B_b$) differs for the two modes (e.g., ($D_e+B_a$)>O or ($D_e+B_b$)<O). This case, entirely realistic for low rotation rates, is illustrated in FIG. 2. The ramp of the resetting signal (illustrated without modulation for clarity) starts, for example, in mode A with a positive gradient, since ($D_e+B_a$)>O. When the ramp reaches the (upper) overflow range (overflow signal SL in FIG. 14), a switch is made to mode B. However, the control then triggers a negative ramp gradient, since it now holds that ($D_e+B_b$)<O. Thus, the ramp gradient changes its sign and leaves the overflow region and mode A once again holds. However, a positive ramp gradient is once again associated with mode A until a reversal to mode B once again takes place. Thus, the control is held "captive" and the interferometer is in the lock-in state. How quickly the "zig-zag-ramp" represented in FIG. 2 changes at the overflow limit between modes A and B is determined by the rapidity of the control which is generally very high. The lock-in state holds for an input rotation rate range in which the specified inequalities are fulfilled. The lock-in range thus has a width of $|B_a-B_b|$.

In the description so far, the ramp value is the instantaneous value of the (unmodulated) ramp $\phi(t)$. This is proportional to the angle of rotation (and corresponds to the signal SADD). The ramp gradient $d\phi/dt$ corresponds to the time derivative of the angle of rotation or rotation rate. The problem of the ramp resetting method of the prior art is that the ramp value (value of the angle of rotation) is the criterion for operating mode A or B and whether the different biases $B_a$ or $B_b$ are present and, since $B_a \neq B_b$, influences the ramp gradient itself. The scale factor error information is present, as mentioned, in the form of a signal of change in intensity, whose frequency is proportional to the rotation rate that can vary between 0 and approximately 100 kHz when the theoretical pulse-duty factor of the modulation deviations between mode A and mode B is 1:3. The apparent advantage of information-carrying changes in intensity occurring more often at high rates of rotation and that, consequently, better scale factor error information is available at high rotation rates, is opposed, however, by the fact that the associated signal processing device has to process a comparatively high frequency range. However, as mentioned, the known ramp resetting method in the region of zero rotation rate leads, on the other hand, to the absence of the scale factor error information and thus to drift problems.

SUMMARY AND OBJECTS OF THE INVENTION

It is an object of this invention to avoid the deadband of a fiber optic rotation rate sensor at low rotation rates.

It is a further object of the invention to achieve the foregoing object while obtaining signals that are easy to process for controlling scale factor.

The foregoing and other objects and advantages are addressed by the present invention that provides an improvement in a fiber optic Sagnac interferometer for measuring rotation rate of the type in which two light beams originating from a light source and generated by beam splitting are irradiated into a fiber coil in opposite directions and subsequently reunited. The interference pattern is applied to a detector device whose output signal corresponds to the light intensity of the interference pattern. The light beams are modulated with the aid of a phase modulator located in the fiber coil by a periodic rectangular signal combined from a plurality of variable signal components having fundamental frequency $f_0 = \frac{1}{2}t_0$ where $t_0$ = transit time of each light beam through the fiber coil in conjunction with periodic change in the modulation deviation a first signal component effecting between two operating modes in time with frequency $f_0$ a reciprocal alternating phase shift ($\phi_m$) of the two counterrotating light beams and a second signal component being a stair-step ramp signal whose risers each have a duration, corresponding to the transit time $t_0$ or integral multiples of $t_0$, and amplitude increments that compensate nonreciprocal phase shifts of the two light beams.

In such an interferometer, the amplified photodetector signal is fed to a first synchronous demodulator clocked with frequency $f_0$. The demodulated and amplified output signal is fed to analog-to-digital converter and after digitization integrated in a digitized integrator and is applied to the phase modulator via a digital-to-analog converter and a driver amplifier to compensate nonreciprocal phase shifts of the light beams by means of the second signal component.

A scale factor correction circuit demodulates the amplified photodetector output signal in time with mode reversal and transmits an analog scale factor correction signal to the digital-to-analog converter via an integrating amplifier. A processor supplies the control and synchronization signals for the first synchronous demodulator, the analog-to-digital converter and the digital integrator.

The improvement provided in such an interferometer includes a digital adder arranged between the digital integrator and the digital-to-analog converter. The modulation deviation signal can be reversed with predetermined timing between the two operating modes at a second input to the adder and that modulation deviation signal is applied from a first pulse generator that is clocked with frequency $f_0$ and transmits a signal corresponding to the phase deviation $\pm\pi/4$ for the first operating mode and a signal corresponding to the pulse deviation $\pm 3\pi/4$ for the second operating mode to the second input of the digital adder.

The foregoing and additional features and advantages of this invention will become further apparent from the detailed description that follows. Such description is accompanied by a set of drawing figures. Numerals of the figures, corresponding to those of the written description, point to the features of the invention, like numerals referring to like features throughout both the written description and drawing figures.

DETAILED DESCRIPTION

Figure 1:
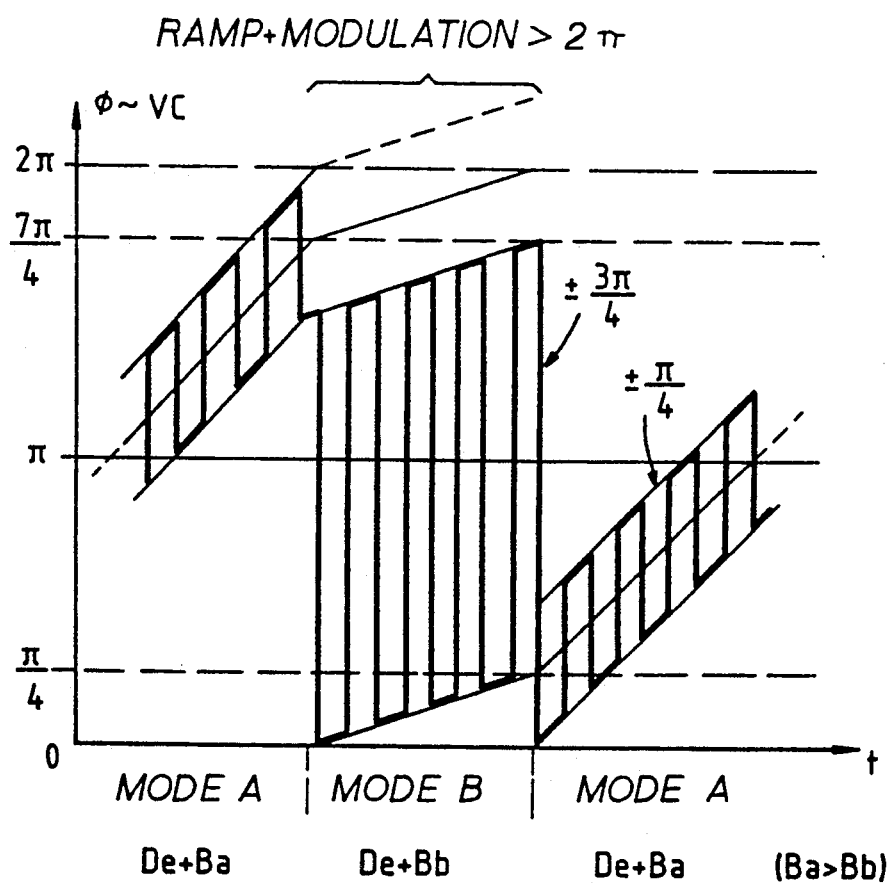
FIG. 1 is a graphical representation of the change in ramp gradient of the resetting signal, as a function of the change in modulation deviation (i.e., operating mode)
Figure 2:
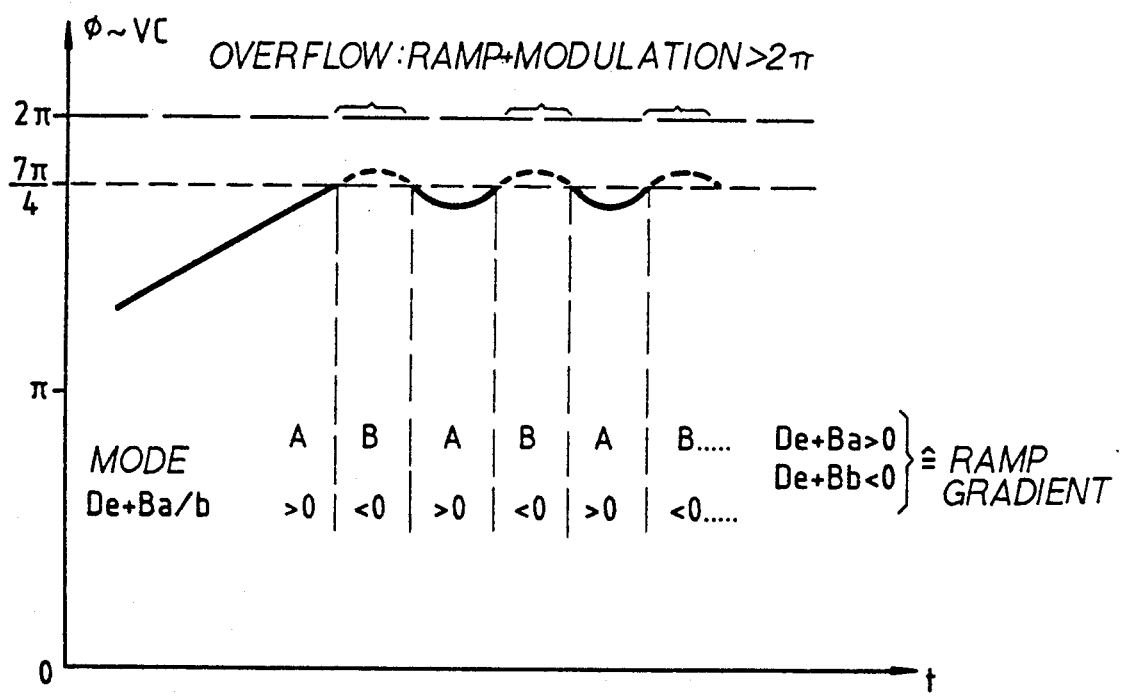
FIG. 2 is a graph for illustrating the lock-in effect at low rates of rotation.

It is known, as explained with reference to FIGS. 1 and 2, that the automatic change in modulation deviation as a function of angle of rotation is the main cause of ramp overflow of the lock-in effect of scale factor nonlinearity and of the wide frequency range of the scale factor error information, which range is a function of rotation rate, in the prior art method. Accordingly, the invention is directed towards developing a modulation method that achieves a ramp resetting method comprising, on the one hand, the reversal of modulation deviation from mode A to mode B to obtain scale factor error information while, on the other hand, stipulating that reversal with a specific (e.g., fixed) timing not a function of angle of rotation.

Starting from the known ramp resetting method, in the invention, a (second) digital adder is arranged between the digital integrator and the digital-to-analog converter. A second input the modulation deviation signal that can be reversed with the predetermined timing between the two operating modes is applied to the adder from a first pulse generator that is clocked with the frequency $f_0$ and transmits (to the second input of the second digital adder) a signal corresponding to the phase deviation $\pm\pi/4$ for the first operating mode A and a signal corresponding to the phase deviation $\pm 3/4\pi$ for the second operating mode B.

Figure 3:
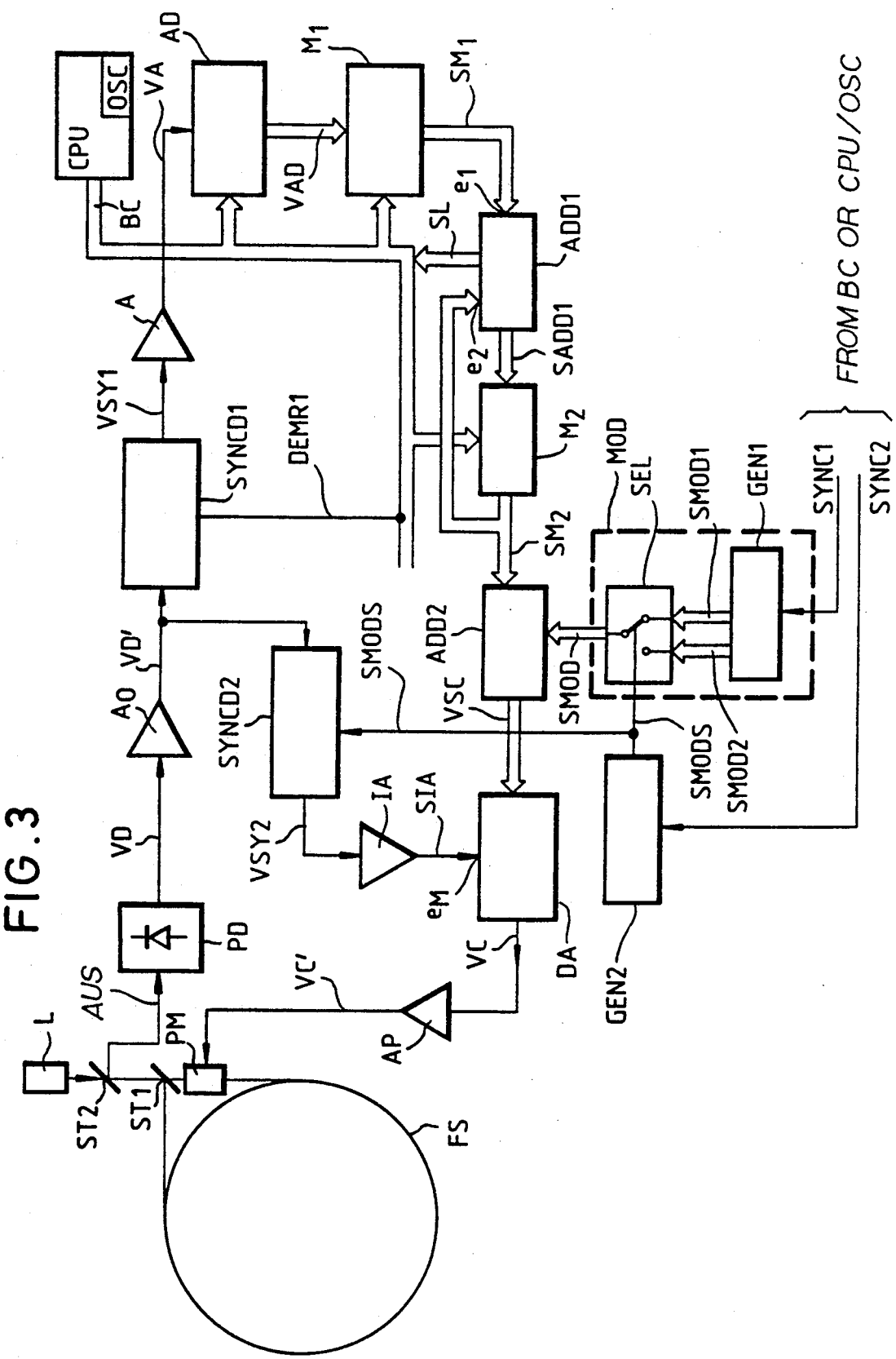
FIG. 3 is a schematic representation of an interferometer for measuring rotation rate according to the invention.
Figure 14:
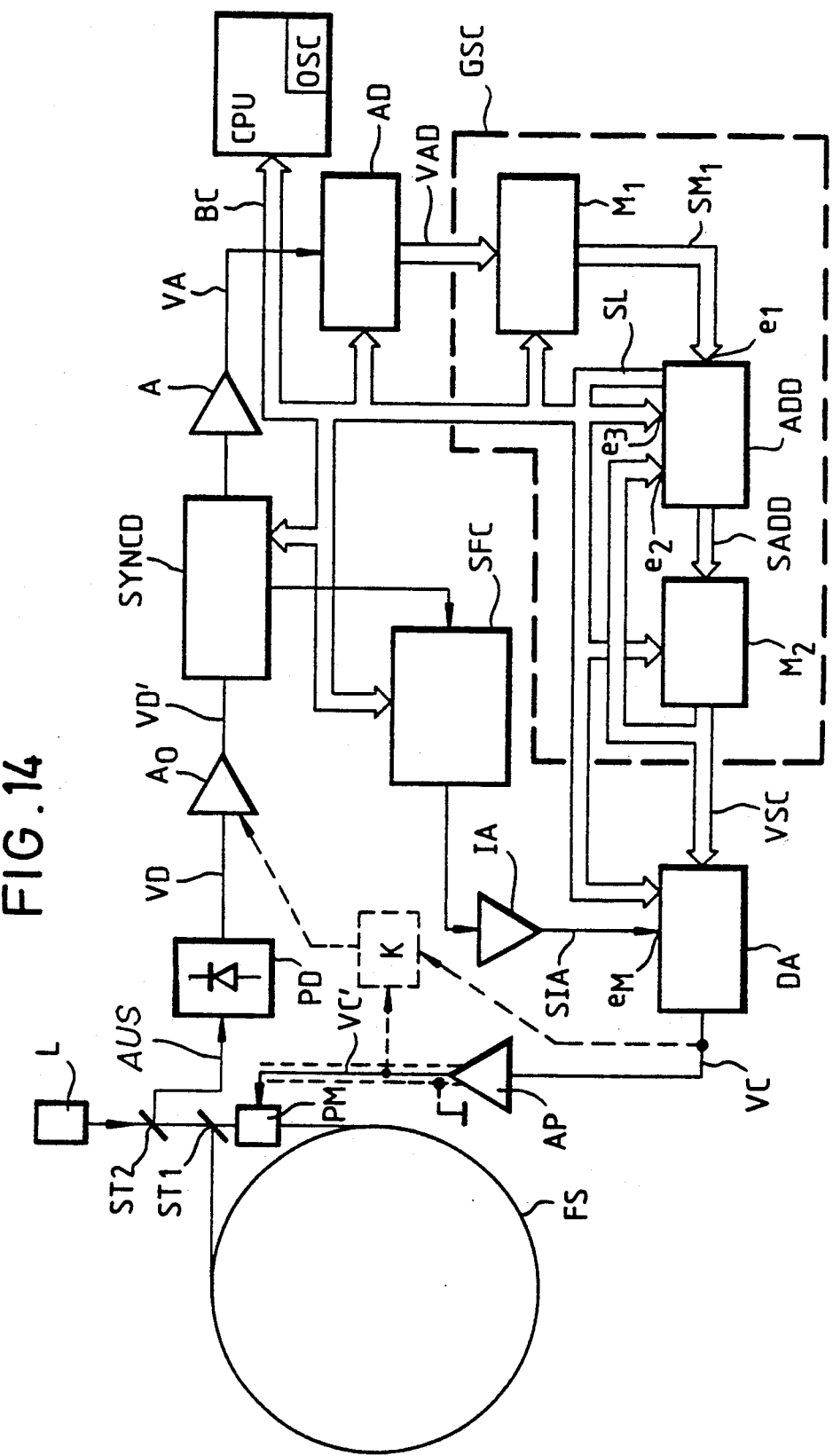
FIG. 14 is a schematic diagram of a fiber optic interferometer of the prior art with digital processing of rotation rate and generation of modulation deviation and ramp resetting signals.

FIG. 3 is a schematic representation of an interferometer for measuring rotation rate according to the invention. The arrangement and circuit groups and signals corresponding to the prior art system of FIG. 14 are referred to with identical signals in FIGS. 3 and 4 and already-described functional relationships are not repeated.

The photodetector PD detects the intensity I of the interferometer output signal, and supplies a corresponding signal VD that is amplified in the amplifier $A_0$ to VD. The light intensity signal I contains the following information:

1) System deviation of rotation rate. This leads to a change in intensity $I_0$ with frequency $f_0$ that is detected in the (first) synchronized demodulator SYNCD1 with the aid of a signal DEMR1, of the same frequency as the output signal VSY1 supplied by the processor CPU. The frequency $f_0$ is the interferometer operating frequency, which is given by $f_0 = \frac{1}{2}t_0$, where $t_0 = n \times 1/c$ ($n$ = refractive index of the light guide material of the fiber coil FS; $1$ = optical path length in the fiber coil FS, and $c$ = velocity of light in a vacuum);

2) System deviation of the scale factor (i.e., deviation in the deviation of the phase modulation of the electrooptic phase modulator PM in the interferometer). This leads to a change of intensity $\Delta I_1$ (cf. FIG. 12) between the modulation modes A and B with the frequency of a modulation deviation reversal signal SMODS. This is explained in greater detail below. It is generated in a pulse generator GEN2 (designated as second generator) and can be synchronized with the gyroscope operating frequency $f_0$ via a signal SYNC2 supplied by the processor CPU. The difference in intensity $\Delta I_1$ is detected in a (second) synchronous demodulator SYNCD2 with the aid of the signal SMODS, resulting in a signal VSY2 that is a measure of the scale factor error and, as in the case of the circuit according to FIG. 14, is applied via the integrating amplifier IA to an analog setting input $e_m$ of the digital-to-analog converter DA.

For clarity, the rotation rate control circuit is first explained below, followed by the scale factor control circuit.

Rotation Rate Control Circuit

The signal VSY1, which corresponds to a system deviation of the rate-of-rotation control circuit, is amplified in the amplifier A to supply the signal VA. The amplifier A also comprises a filter that determines the technical control characteristics of the entire control circuit and is arranged according to known design procedures (e.g., U.S. Pat. No. 4,705,399). The output signal VA includes a component of the time integral of the input signal VSY1. This signal is digitized in the analog-to-digital converter AD, and the digital output signal VAD is stored in the memory M1 under control of the processor CPU through the bus BC. As known, the output signal SM1 is applied to the input $e_1$ of the adder (designated, for differentiation from a further adder, as first adder ADD1). The output signal SADD1 from the first adder ADD1 is fed to the memory M2 whose output signal SM2 is fed to input $e_2$ of the first adder ADD1, as in the case of the known circuit of FIG. 14. The first adder ADD1, in conjunction with the memory M2 and the allocated control via the bus BC, forms a ramp signal generator that generates a ramp or staircase signal SM2 whose riser height corresponds to the value SM1 and whose step width corresponds to the optical transit time $t_0$.

Figure 5:
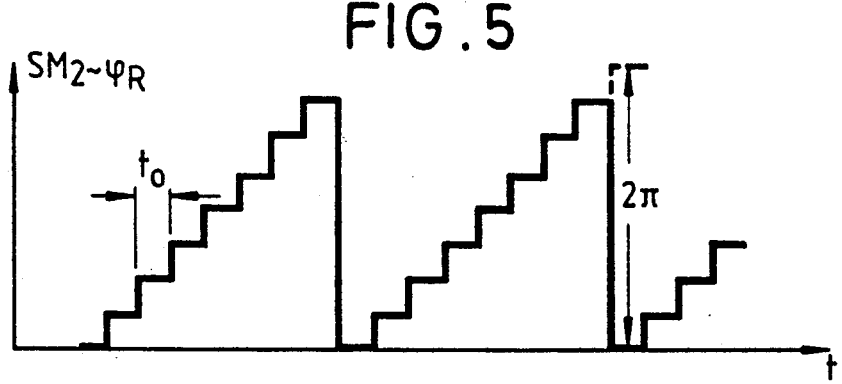
FIGS. 5 through 13 comprise a set of waveforms for explaining the operation of the circuits according to FIGS. 3 and 4.

By limiting the word length of the digital processing device consisting of the first adder ADD1 and the second memory M2, ramp overflow of the signal SM2 occurs when a specific output value of the first adder ADD1 is exceeded, as is represented schematically in FIG. 5. As a result, it is possible to advantageously exploit the overflow characteristics of digital binary number codes.

This signal, designated as second signal component SM2, is fed—in contrast to the known circuit of FIG. 14—to the optical phase modulator PM via electronic modules, described below, to effect a phase shift $\phi$ that is limited by the above-referenced overflow to a phase range of essentially $2\pi$ (cf. FIG. 5).

Figure 6:
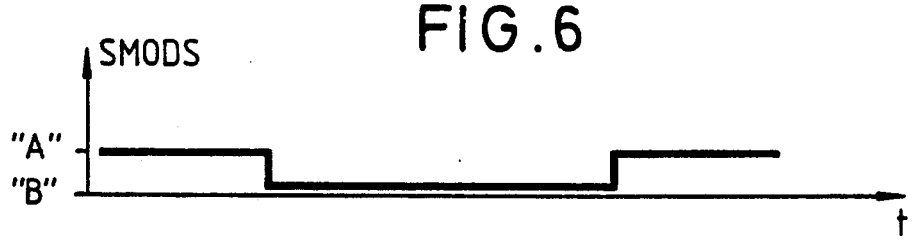
Figure 7:
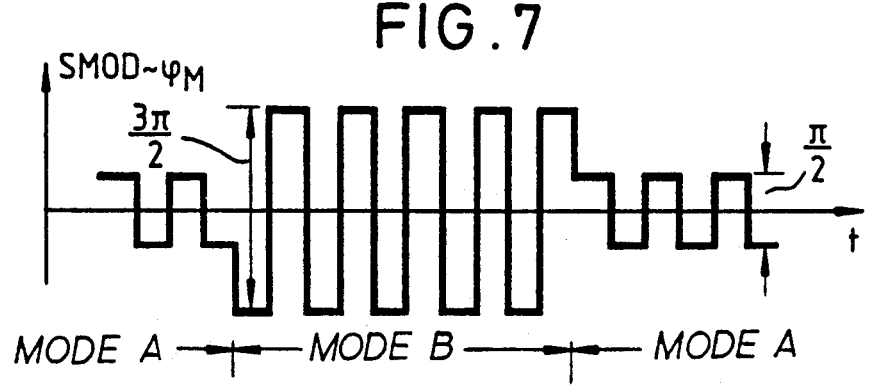

In accordance with the invention, an essentially rectangular modulation signal SMOD is added in a second adder ADD2 to the signal SM2 to produce a combined modulation signal VSC. The modulation signal SMOD, of gyroscope frequency $f_0$, is generated in a modulation signal generator MOD. The modulation signal generator MOD is synchronized by the processor CPU or the oscillator OSC via a signal SYNC1. The amplitude of the signal SMOD can be varied by a factor of 3, in a manner to be explained in detail below, via a signal SMODS (cf. FIG. 6) taken from the second pulse generator GEN2. The signal component SMOD (cf. FIG. 7) is added in the second adder ADD2 to the signal SM2, and fed to the optical phase modulator PM via the driver amplifier AP after conversion to analog in the digital-to-analog converter DA. The signal component SMOD there effects a phase shift $\phi_m$ that is essentially $\pm\pi/4$ or $\pm 3\pi/4$ (cf. FIG. 7). The amplitude of the modulation $\phi_m$ is thus controlled by SMODS. As explained above, the state during which the amplitude is $\pm\pi/4$ is termed "mode A", while "mode B" is set for the larger deviation of modulation amplitude of $\pm 3\pi/4$.

As shown in FIG. 3, a modulation amplitude reversal can occur. For example, two signals, SMOD1 corresponding to mode A and SMOD2 corresponding to mode B, might be generated in a generator GEN1 with the referenced amplitudes and alternately applied as signal SMOD to the second input of the second adder ADD2 through a changeover switch SEL controlled by the signal SMODS.

The digital processing word width of the second adder ADD2 is chosen so that the output signal VSC always corresponds to the sum of the input signals SM2 or SMOD, without overflow of the result. The combined signal VSC (cf. FIG. 8) is fed in the referenced manner to the digital-to-analog converter DA, converted into the voltage signal VC and amplified to form the signal VC' whose value is essentially proportional to the numerical value of the signal VSC. The voltage VC' effects a phase shift $\Delta\phi_c$ (see FIG. 8) in the optical phase modulator PM.

Thus, the circuit according to the invention as seen in FIG. 3 is based upon the following principle: The unmodulated digital ramp value is limited by truncation above the bit of significance $\pi$ to the phase angle range $2\pi$ (i.e, $\pm\pi$). A rectangular signal is added to the limited ramp in the second adder ADD2. Such signal is generated in the first pulse generator GEN1, SEL or MOD having the modulation frequency $f_0$, and reversible in amplitude in accordance with a phase angle value of $\pm\pi/4$ (mode A) and $\pm 3\pi/4$ (mode B). The reversal is controlled by the second pulse generator GEN2 whose frequency and pulse-duty factor are freely selectable. The reversal values can be permanently predetermined by the processor CPU or controlled as a function of the rotation rate. It is advisable to synchronize the reversal with the modulation frequency $f_0$.

Figure 8:
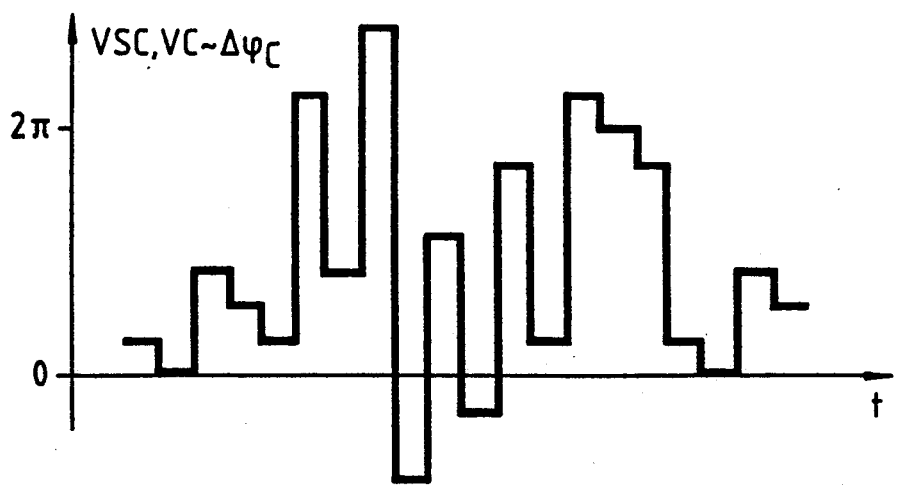

The modulated ramp signal shown in FIG. 8, which is fed to the phase modulator PM Via the interferometer, produces an intensity signal I(t) at the output of the interferometer that satisfies the following relationship:

$$I(t) \sim \cos(\Delta\phi(t) + \Delta\phi_0(t))$$

where $\Delta\phi(t) = \Delta\phi_c(t) - \Delta\phi_c(t-t_0)$ is valid; $\Delta\phi_c(t)$ is the phase shift at the phase modulator PM and $\Delta\phi_0(t)$ is the Sagnac phase shift which is proportional to the rotation rate and is given by $$\Delta\phi_0 = \frac{2\pi \cdot l \cdot D}{\lambda \cdot c} \cdot \Omega$$

Where l is the length and D is the mean diameter of the fiber coil (FS) optical path, $\lambda$ the wavelength of the light employed, c the velocity of light in a vacuum and $\Omega$ the rate of rotation.

Figure 9:
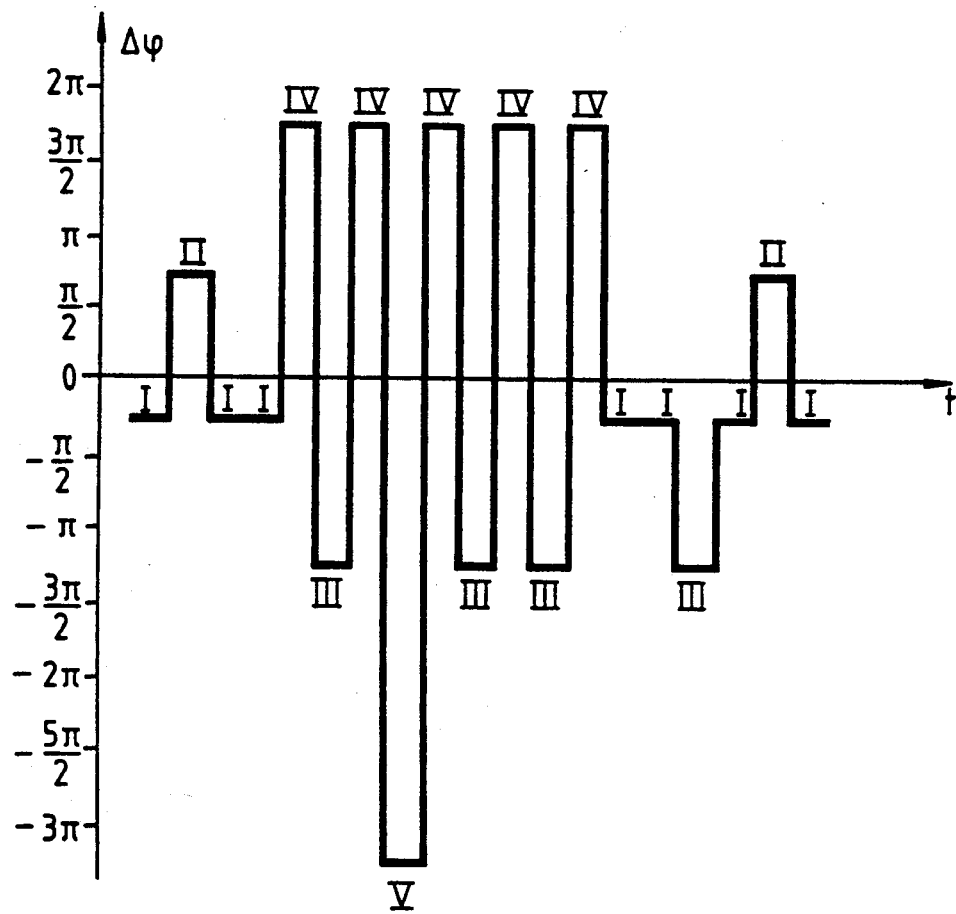
Figure 10:
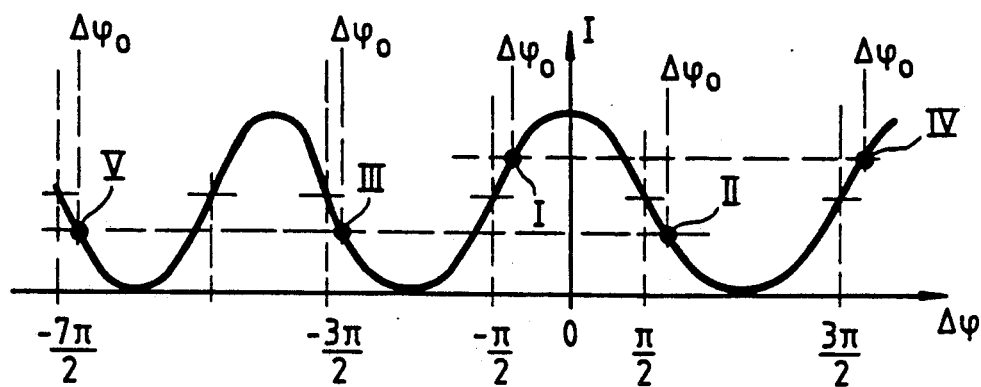
Figure 12:
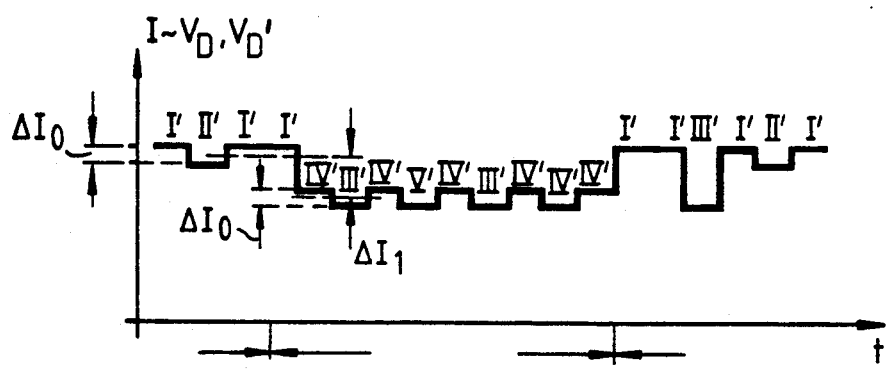

The signal $\Delta\phi(t)$ is represented in FIG. 9. FIG. 10 reproduces the resultant variation in intensity as a function of $\Delta\phi(t)$ and $\Delta\phi_0(t)$ As can be seen from these two figures, the phase shift $\phi_0(t)$ proportional to the rotation rate indicates that the intensity I rises in the time intervals "I" and "IV" and falls in the time intervals "II", "III" or "V". The resultant variation in intensity with time I(t) is represented in FIG. 12.

The difference in intensity $\Delta I_0$ is, as mentioned above, detected with the aid of the first synchronous demodulator SYNCD1 and serves to control the ramp gradient of the signal $\phi_R$ (cf. FIG. 5). The effect of $\Delta\phi_0$ is compensated by the mean value of the phase shift $\Delta\phi$, which has the same modulus but a different sign. It then holds for the intensity I(t) that:

$$I(t) \sim \cos(\Delta\phi(t) + \Delta\phi_0(t)) = const.$$

It follows from this that the ramp gradient of $\phi_R$ is a measure of the rotation rate.

Instead of rotation rate $\phi_R$, it can be advantageous to read out the angle of rotation as the integral thereof. This can be done, for example, by counting the above-mentioned overflows of the ramp signal SM2 at the output of the second memory M2 or of the output signal SADD1 of the first adder ADD1. An overflow and, resulting from this, a return in the phase angle $\phi_R$ by $2\pi$ corresponds in this process to an angular increment $\alpha$ of $$\alpha = \frac{\lambda \cdot n}{nD}$$

When an interferometer with a fiber coil diameter D=6 cm is employed, the angular increment $\alpha$ is approximately 4 angular seconds. This overflow information can be given, for example, by the first adder ADD1 via its overflow output signal SL and the bus BC to the processor CPU, which counts the angular increments.

Scale Factor Control Circuit

As explained above, the output signal VSY2 of the second synchronous demodulator SYNCD2 provides a measure of the scale factor error. This error signal is applied to the integrating amplifier IA, which represents a filter dimensioned from a standpoint of control engineering and determines the control-engineering properties of the scale factor control. The output signal SIA contains at least one component that corresponds to the time integral of the input signal VSY2. As in the case of the circuit of FIG. 14, the signal SIA is fed to the input $e_m$ of the digital-to-analog converter DA. The digital-to-analog converter DA may be a multiplying digital-to-analog converter with its output quantity VC proportional to the product of the two signals VSC (digital) and SIA (analog). Thus, with the aid of the information on differences in intensity $\Delta I_1$ (FIG. 12) the voltage deviation of the signal VC is controlled so that the modulation phase deviation at the optical phase modulator PM is exactly $\pm\pi/4$ (mode A) or $\pm 3/4\pi$ (mode B). It is thus assured at the same time that the return of the phase $\phi_R$ due to the overflow (cf. FIG. 5) corresponds to exactly $2\pi$.

Figure 11:
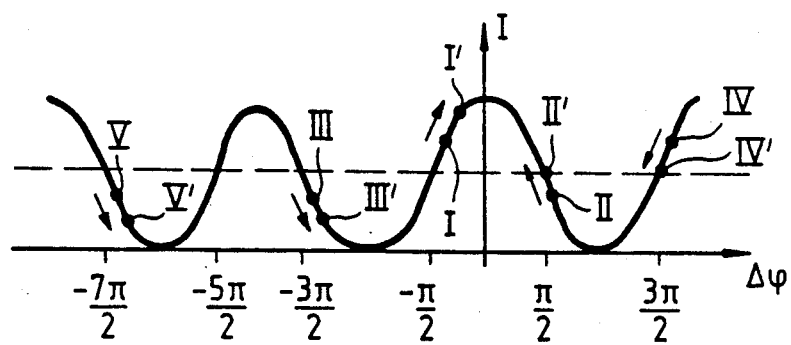

FIG. 11 illustrates how, given the presence of scale factor errors (e.g., of the type such that the optical phase shift is present to a lesser extent than desired), operating points I, II, III, IV or V, which determine the variation in intensity, are shifted to the operating points I', II', III', IV', V', and, thus, how the above-mentioned change in intensity $\Delta I_1$ (FIG. 12) is produced. By feeding the appropriate correction signal SIA to the input $e_m$ of the digital-to-analog converter DA, the output amplitude of the signal VC and, thus, the optical phase shift, are increased so that the desired operating points I, II, III, IV, V are reached again and the change in intensity $I_1$ vanishes.

Figure 13:
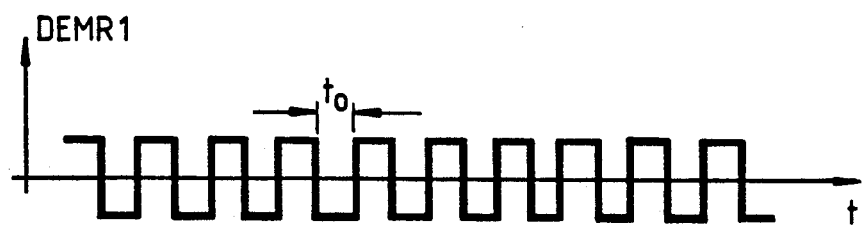

For completeness, FIG. 13 further shows the synchronization signal DEMR1 to be fed to the first synchronous demodulator SYND1 via the bus BC.

Figure 4:
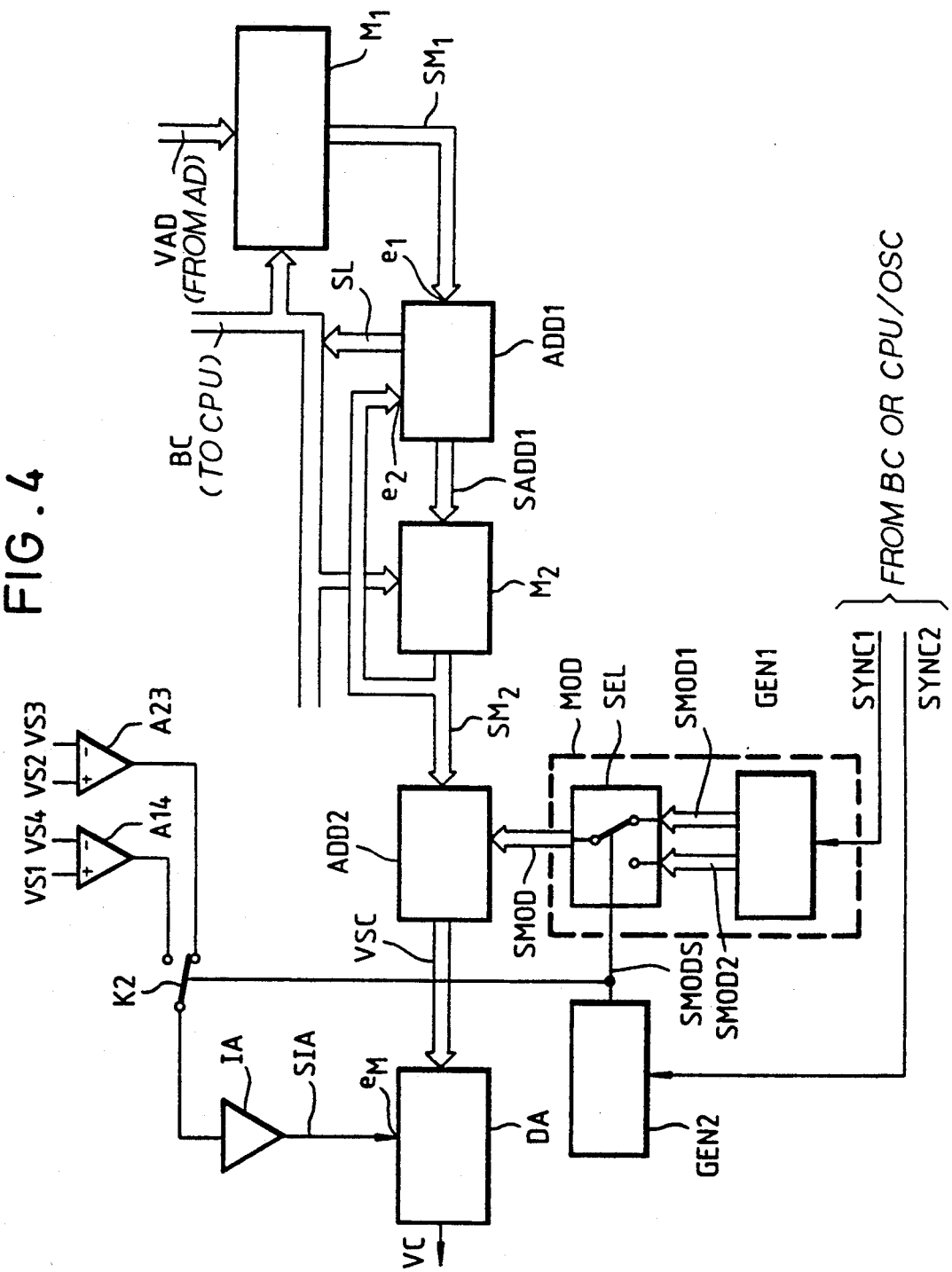
FIG. 4 is a schematic diagram of an alternative embodiment of the interferometer according to FIG. 3.

The (partial) circuit represented in FIG. 4 corresponds entirely in its mode of operation to that of FIG. 3. The only difference lies in the fact that the second synchronous demodulator is formed—in a manner analogous to FIG. 14 of U.S. Pat. No. 4,705,399—by two difference amplifiers A14 and A23 to whose positive or negative inputs the signals VS1, VS2 or VS4, VS3, respectively, of four sample-and-hold circuits are applied in a manner not shown in detail. However, a difference from the known circuit exists in that the changeover switch K2 on the output side through which the change in intensity signal is finally applied to the integrating amplifier IA, is controlled by the freely selectable but fixed output signal SMODS of the second pulse generator GEN2 (i.e., in time with the permanently predetermined mode deviation reversal or modulation deviation reversal).

It is true that, in a circuit as modified in accordance with the invention such as that of FIGS. 3 or 4, an interference of the different modulation deviation does continue to effect a change in bias. However, the latter is no longer a function of the rotation rate. Rather, its value is constant and corresponds to the mean value, weighted in terms of the pulse-duty factor, of the bias values of the two modulation deviations. Since the frequency and the pulse-duty factor error with which change in modulation deviation is controlled and with which scale factor error information occurs, are freely selectable within wide limits and known, the scale factor control can be optimized to a fixed frequency.

By contrast with known implementations for a fiber optic inertial rotation rate sensor with digital phase ramp resetting, the invention offers the decisive advantage that the described lock-in effect and the scale factor nonlinearity bound thereto are avoided, and signals that are more advantageous to process are present for scale factor control.

The elaborate EMC measures previously thought necessary for gyroscope electronics can be at least partly avoided.

The extra expenditure on circuitry required in the digital part of the control electronics is relatively low and not significant in the use of modern integrated circuits.

Since the range of modulation of the phase modulator PM is slightly increased, a somewhat higher capacity for modulation in the analog driver components and a 1-bit increase in the resolution of the digital-to-analog converter are required. However, in light of the considerable practical advantages of the invention, such slight extra expenditure is negligible.

To the extent that the statements above and the patent claims given below begin with the fundamental or interferometer operating frequency $f_0 = \frac{1}{2}t_0$, the device of the invention for the measurement of rotation rate is also capable of operating at a slightly detuned frequency.

As a rule, within the framework of the invention, the central processor (CPU) can be and is implemented by means of a commercially available microprocessor. "Hard-wired" logic may be equivalently employed without deviating from the concept of the invention.

While this invention has been described with reference to its currently preferred embodiment, it is not so limited. Rather, this invention is limited only insofar as defined by the following set of claims and includes within its scope all equivalents thereof.

What is claimed is:

1. In a fiber optic Sagnac interferometer for measuring rotation rate of the type in which: two light beams originating from a light source and generated by beam splitting are irradiated into a fiber coil in opposite directions and subsequently reunited; the interference pattern produced is applied to a detector device whose output signal corresponds to the light intensity of the interference pattern; with the aid of a phase modulator located in the fiber coil the two light beams are modulated by a periodic rectangular signal combined from a plurality of variable signal components having fundamental frequency $f_0 = \frac{1}{2}t_0$, where $t_0 =$ transit time of each of the light beams through the fiber coil; in conjunction with periodic change in the modulation deviation a first signal component effecting between two operating modes in time with frequency $f_0$ a reciprocal alternating phase shift ($\phi_m$) of the two counterrotating light beams, and a second signal component being a stair-step ramp signal whose risers each have a duration, corresponding to the transit time $t_0$ or integral multiples of $t_0$, and amplitude increments that compensate nonreciprocal incremental phase shifts of the two light beams; the amplified photodetector output signal is fed to a first synchronous demodulator clocked with frequency $f_0$; the demodulated and amplified output signal is fed to an analog-to-digital convertor and after digitization integrated in a digital integrator and is applied to the phase modulator via a digital-to-analog convertor and a driver amplifier to compensate nonreciprocal phase shifts of the light beams by means of the second signal component; a scale factor correction circuit demodulates the amplified photodetector output signal in time with mode reversal and transmits an analog scale factor correction signal to the digital-to-analog convertor via an integrating amplifier; and in which a processor supplies the control and synchronization signals for the first synchronous demodulator, the analog-to-digital converter and the digital integrator, the improvement comprising:

a) a digital adder arranged between the digital integrator and the digital-to-analog convertor;
   b) the modulation deviation signal is reversed in accordance with predetermined timing between said two operating modes at a second input to said adder; and c) said modulation deviation signal is applied form a first pulse generator that is clocked with the frequency $f_0$ and transmits a signal corresponding to the phase deviation $\pm\pi/4$ for the first operating mode and a signal corresponding to the phase deviation $\pm 3\pi/4$ for the second operating mode to the second input of the digital adder.

2. An interferometer as defined in claim 1, additionally comprising:
   a) a changeover switch located between said first pulse generator and said second input of said digital adder; and
   b) said switch is actuated by a second pulse generator in time with operating mode reversal so that said pulse signal passes to the second input of the digital adder, said pulse signal corresponding in said first operating mode to the phase deviation $\pm\pi/4$ and in said second operating mode to the phase deviation $\pm 3\pi/4$.

3. An interferometer as defined in claim 2 wherein the operating frequency and the pulse-duty factor of the second pulse generator are freely selectable.

4. An interferometer as defined in claim 2 wherein the pulse-duty factor and/or the frequency of the second pulse generator can be controlled as a function of the rotation rate.

5. An interferometer as defined in claim 2 wherein the pulse-duty factor and/or the frequency of the second pulse generator is synchronized with the modulation frequency $f_0$.

6. An interferometer as defined in claim 2 wherein the output signal of the second pulse generator is the clock signal for the demodulator that supplies the scale factor correction signal.

* * * * *